(12) United States Patent
Shil

(10) Patent No.: US 11,023,289 B2
(45) Date of Patent: Jun. 1, 2021

(54) CLOUD ENVIRONMENT CONFIGURATION BASED ON TASK PARALLELIZATION

(71) Applicant: VMware, Inc., Palo Alto, CA (US)

(72) Inventor: Suman Chandra Shil, Fremont, CA (US)

(73) Assignee: VMWARE, INC., Palo Alto, CA (US)

( * ) Notice: Subject to any disclaimer, the term of this patent is extended or adjusted under 35 U.S.C. 154(b) by 138 days.

(21) Appl. No.: 16/509,822

(22) Filed: Jul. 12, 2019

(65) Prior Publication Data

US 2021/0011782 A1    Jan. 14, 2021

(51) Int. Cl.
*G06F 9/52* (2006.01)
*G06F 9/48* (2006.01)
*H04L 29/08* (2006.01)
*H04L 12/24* (2006.01)
*G06F 9/455* (2018.01)

(52) U.S. Cl.
CPC ............ *G06F 9/52* (2013.01); *G06F 9/45558* (2013.01); *G06F 9/4881* (2013.01); *H04L 41/08* (2013.01); *H04L 67/10* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 9,183,016 | B2* | 11/2015 | Zhou | G06F 9/45558 |
| 9,323,619 | B2* | 4/2016 | Jacobson | G06F 9/5066 |
| 9,594,637 | B2* | 3/2017 | Jacobson | G06F 9/5066 |
| 10,474,488 | B2* | 11/2019 | Aleksandrov | G06F 9/52 |
| 10,509,680 | B2* | 12/2019 | Kumar | G06F 9/4881 |

* cited by examiner

*Primary Examiner* — Van H Nguyen
(74) *Attorney, Agent, or Firm* — SU IP Consulting

(57) ABSTRACT

Example methods and computer systems for cloud environment configuration based on task parallelization. One example method may comprise: obtaining a task data structure specifying execution dependency information associated with a set of multiple configuration tasks that are executable to perform cloud environment configuration. The method may also comprise: In response to identifying a first configuration task and a second configuration task that are ready for execution based on the task data structure, triggering execution of the first configuration task and the second configuration task. The method may further comprise: in response to determination that the first configuration task has been completed, identifying third configuration task(s) that are ready for execution based on the task data structure; and triggering execution of the third configuration task(s) by respective third compute node(s).

21 Claims, 9 Drawing Sheets

US 11,023,289 B2

CLOUD ENVIRONMENT CONFIGURATION BASED ON TASK PARALLELIZATION

BACKGROUND

Virtualization allows the abstraction and pooling of hardware resources to support virtual machines in a software-defined data center (SDDC). For example, through server virtualization, virtualization computing instances such as virtual machines (VMs) running different operating systems may be supported by the same physical machine (e.g., referred to as a "host"). Each VM is generally provisioned with virtual resources to run a guest operating system and applications. The virtual resources may include central processing unit (CPU) resources, memory resources, storage resources, network resources, etc. In practice, a user (e.g., organization) may run VMs using on-premise data center infrastructure that is under the user's private ownership and control. Additionally, the user may run VMs in the cloud using infrastructure under the ownership and control of a public cloud provider. In practice, it is desirable to configure private and/or public cloud environments in an efficient manner.

DETAILED DESCRIPTION

Figure 1:
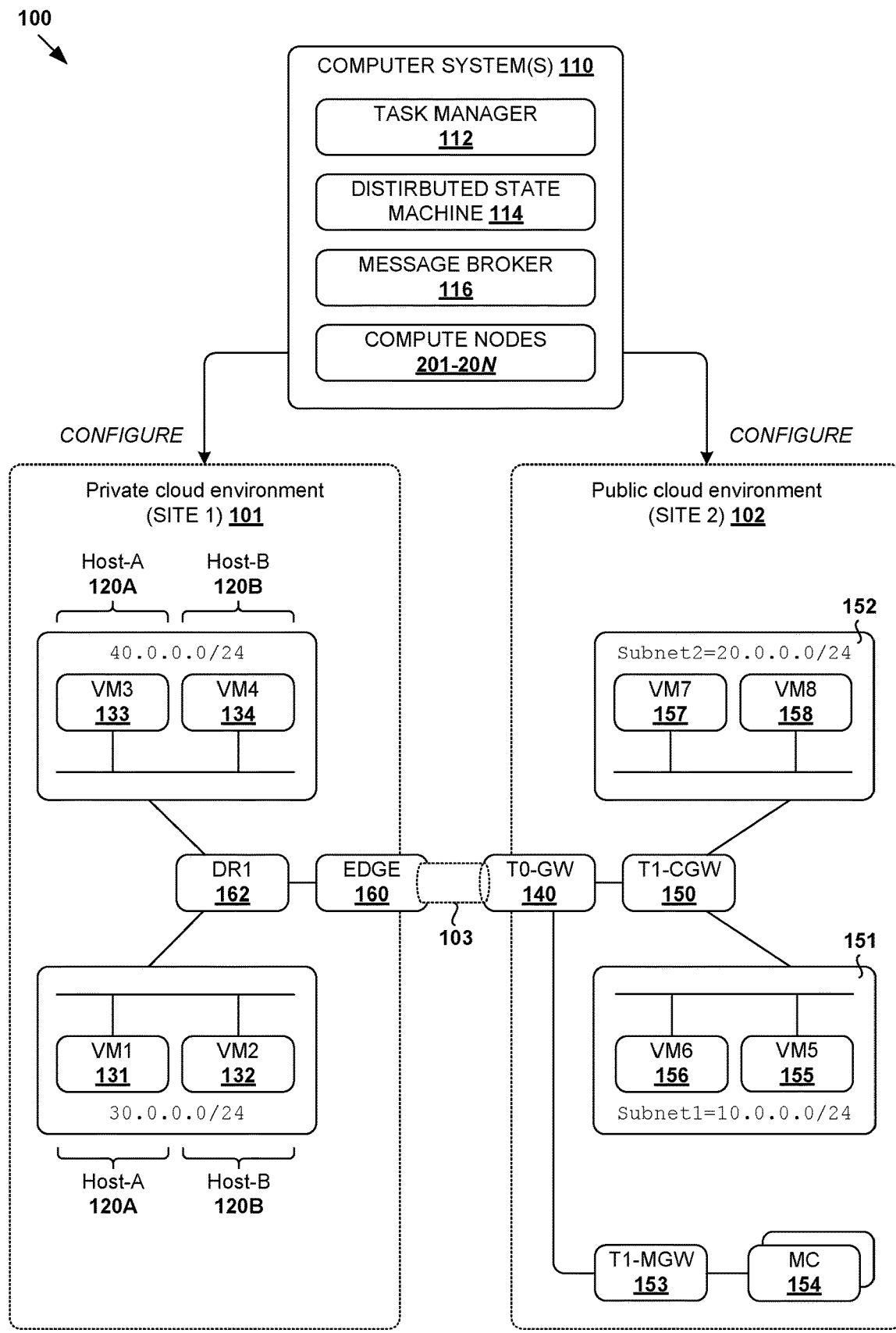
FIG. 1 is a schematic diagram illustrating example cloud environment in which cloud environment configuration based on task parallelization may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to cloud environment configuration will now be explained in more detail using FIG. 1, which is a schematic diagram illustrating example cloud environment 100 in which configuration based on task parallelization may be performed. Depending on the desired implementation, cloud environment 100 may include additional and/or alternative components than that shown in FIG. 1. Although the terms "first" and "second" are used to describe various elements, these elements should not be limited by these terms. These terms are used to distinguish one element from another. For example, a first element may be referred to as a second element, and vice versa.

In the example in FIG. 1, cloud environment 100 spans across multiple geographical sites, such as a first geographical site where private cloud environment 101 is located, a second geographical site where public cloud environment 102 is located, etc. In practice, the term "private cloud environment" may refer generally to an on-premise data center or cloud platform supported by infrastructure that is under an organization's private ownership and control. In contrast, the term "public cloud environment" may refer generally a cloud platform supported by infrastructure that is under the ownership and control of a public cloud provider.

(a) Public Cloud Environment

Referring first to public cloud environment 102, a "public cloud provider" is generally an entity that offers a cloud-based platform to multiple users or tenants. This way, a user may take advantage of the scalability and flexibility provided by public cloud environment 102 for data center capacity extension, disaster recovery, etc. Public cloud environment 102 may be implemented using any suitable cloud technology, such as Amazon Web Services® (AWS), Amazon Virtual Private Cloud (VPC) and Amazon Elastic Compute Cloud (EC2); VMware Cloud™ (VMC) on AWS; Microsoft Azure®; Google Cloud Platform™, IBM Cloud™; a combination thereof, etc. Amazon VPC, AWS and EC2 are registered trademarks of Amazon Technologies, Inc.

In the example in FIG. 1, public cloud environment 102 will be exemplified using VMC on AWS. It should be understood that any additional and/or additional cloud technology may be implemented. Configuration of public cloud environment 102 may involve creating a tier-0 gateway 140 (labelled "T0-GW"), a tier-1 compute gateway 153 (labelled "T1-CGW") and a tier-1 management gateway 151 (labelled "T1-MGW"). In practice, T0-GW 140, T1-MGW 153 and T1-CGW 150 may be logical elements that are implemented by an edge appliance in public cloud environment 102.

For example, T1-MGW 153 may be deployed to handle management-related traffic to and/or from management component(s) 154 (labelled "MC") for managing various entities within public cloud environment 102. T1-CGW 150 may be deployed to handle workload-related traffic to and/or from virtual machines (VMs) or EC2 instances, such as VM5 155 and VM6 156 deployed on a first subnet=10.0.0.0/24 (see 151), and VM7 157 and VM8 158 deployed on a second subnet=20.0.0.0/24 (see 152).

(b) Public Cloud Environment

In private cloud environment 101, EDGE 160 may be deployed at the edge of private cloud environment 101 to handle traffic to and from public cloud environment 102. EDGE 160 may be any suitable an entity that is capable of performing functionalities of a switch, router, bridge, gateway, edge appliance, or any combination thereof. EDGE 160 may communicate with T0-GW 140 in public cloud environment 102 using any suitable tunnel(s) 103, such as Internet Protocol Security (IPSec), layer-2 virtual private network (L2VPN), direct connection, etc. This way, VMs such as 131-134 in private cloud environment 101 may connect with VMs 155-158 in public cloud environment 102 over tunnel 103. In practice, VMs 131-134 may be supported by any suitable physical hosts, such as host-A 120A and host-B 120B (see also FIG. 8).

Through virtualization of networking services, logical overlay networks (also known as "logical network") may be provisioned, changed, stored, deleted and restored programmatically without having to reconfigure the underlying physical hardware architecture. A logical network may be formed using any suitable tunneling protocol, such as Virtual eXtensible Local Area Network (VXLAN), Stateless Transport Tunneling (STT), Generic Network Virtualization Encapsulation (GENEVE), etc. For example, VM1 131 on host-A 120A and VM2 132 on host-B 120B may be connected to the same logical switch, and the same logical layer-2 segment associated with subnet=30.0.0.0/24. In another example, VM3 133 and VM4 134 may deployed on the same segment associated with subnet=40.0.0.0/24. Both segments may be connected to a logical distributed router (labelled "DR1" 162), which may span multiple hosts.

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

(c) Configuration

In the example in FIG. 1, private cloud environment 101 and/or public cloud environment 102 may be configured using computer system(s) 110. For example, task manager 112 may be configured to implement a configuration task to configure various components in cloud environment 101/102. In practice, a long-running configuration task may be divided into a set of N (smaller) configuration tasks or sub-tasks, each usually having a shorter running time. For example, to configure public cloud environment 102 using Amazon AWS technology, the set of configuration tasks may include creating a VPC, creating various subnets (e.g., 151-152) in which VMs 155-158 are deployed, creating various gateways (e.g., T1-CGW 150 and T1-MGW 153), creating EC2 instances (e.g., VMs 155-158), etc.

Conventionally, hard-coded logic is used for cloud environment configuration, which means the set of configuration tasks are explicitly outlined in the source code or program. In this case, the dependency among the configuration tasks is hard-coded in the source code, which can only be modified by editing the source code directly. Such conventional approaches lack efficiency and flexibility. As the complexity of cloud environment 101/102 increases, the source code also becomes more complex to update and maintain. This makes it challenging to manage various configuration tasks.

Task Parallelization

According to examples of the present disclosure, cloud environment configuration may be performed in an improved manner based on task parallelization. As used herein, the term "task parallelization" may refer generally to running multiple tasks concurrently when the tasks are independent from each other. The term "configuration task" or "task" may refer generally to a unit of work, which may include one or more operations executable by a compute node (to be discussed below). In relation to cloud environment configuration, example tasks may include configuring a "logical element" or "logical construct" in cloud environment 101/102.

Example logical elements may include virtualized computing instances (e.g., VMs, containers, endpoints, applications), logical networks (e.g., subnets, logical layer-2 segments, VPCs), logical forwarding elements (e.g., logical ports, logical routers, logical switches, EDGE 160, gateways), etc. The term "configuring" may refer generally to creating, updating or removing a logical element, setting a characteristic or behaviour associated with the logical element (e.g., defining a value for a data field defining a configuration), moving the element (e.g., VM migration), switching off the element, etc. Examples of the present disclosure may be implemented to improve the process of data center configuration, such as the initial deployment or creation and subsequent updates.

Figure 2:
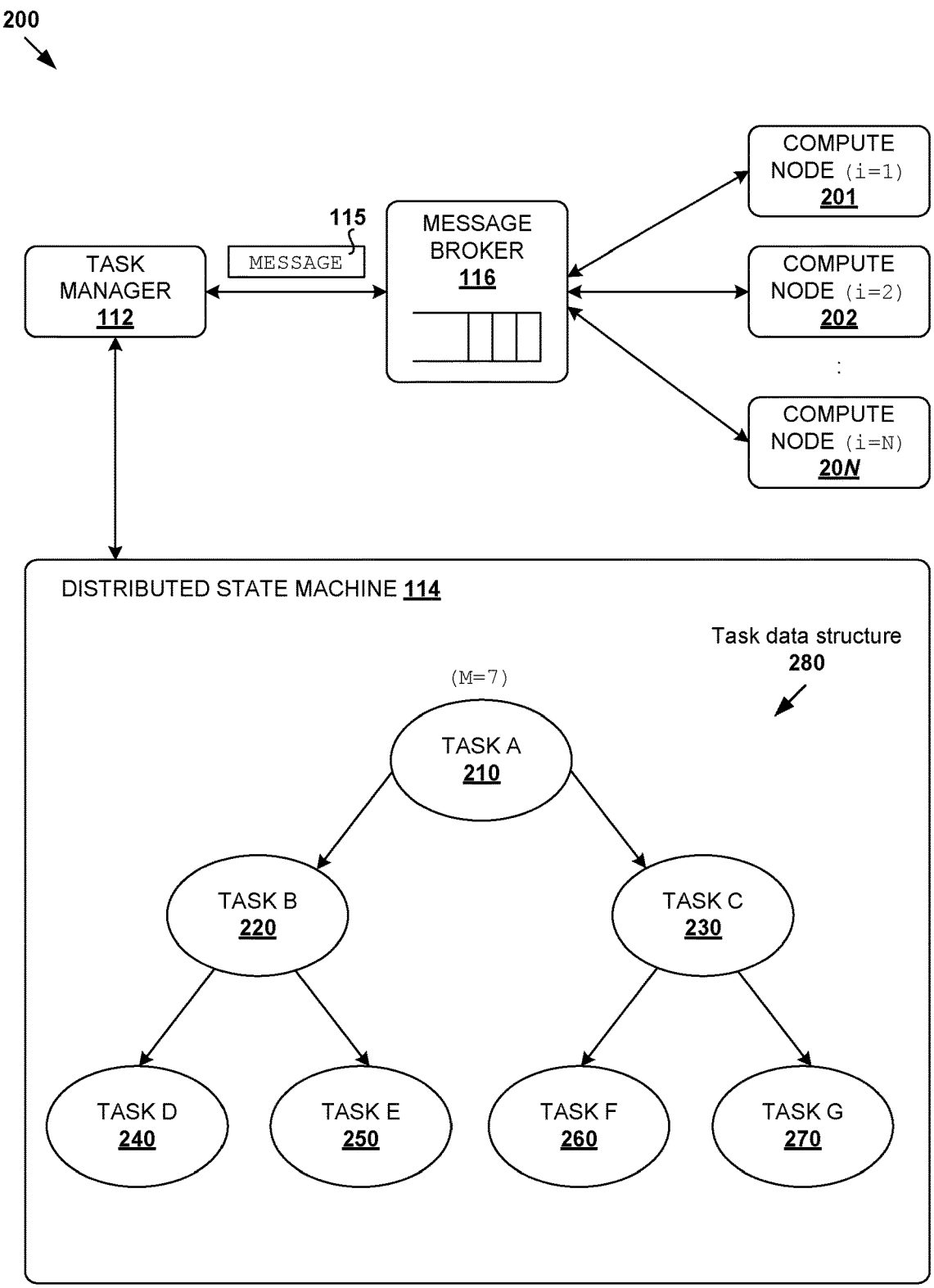
FIG. 2 is a schematic diagram illustrating an example system architecture to perform cloud environment configuration based on task parallelization.

In more detail, FIG. 2 is a schematic diagram illustrating example system architecture 200 to perform cloud environment configuration based on task parallelization. In this example, computer system(s) 110 may be configured to manage or orchestrate various configuration tasks relating to cloud environment 101/102. Computer system(s) 110 may support various components, such as task manager 112, distributed state machine 114, message broker 116, and compute nodes 201-20N. Task manager 112 may be configured to initiate a long-running task. Distributed state machine 114 may be used to model the cloud environment configuration using a set of tasks and state transitions among them.

As used herein, the term "compute node" may refer to a physical machine or a virtualized computing instance (e.g., VM, container, etc.). A physical machine may support a compute node that is connected to other compute nodes via a physical network. A physical machine may support multiple compute nodes, each being implemented using a virtualized computing instance supported by the physical machine. In the case of container, multiple containers representing respective compute nodes may running inside a VM or a physical machine. Compute nodes 201-20N may be connected with message broker 116 via any suitable network connection.

According to examples of the present disclosure, task data structure 280 may be configured to define a set of tasks 210-270 forming a long-running task, and dependency information associated with tasks 210-270. For example, "TASK B" 220 and "TASK C" 230 are dependent from "TASK A" 210. "TASK D" 240 and "TASK E" 250 are dependent from "TASK B" 220, but independent from "TASK C" 230. "TASK F" 260 and "TASK G" 270 are dependent from "TASK C" 230. In one example, the execution of tasks 210-270 may be managed using message broker 116, which may represent a queue for storing tasks to be executed in the form of messages (see 115). Each task in the set may represent an asynchronous operation executable by one of N compute nodes (see 201-20N).

Figure 3:
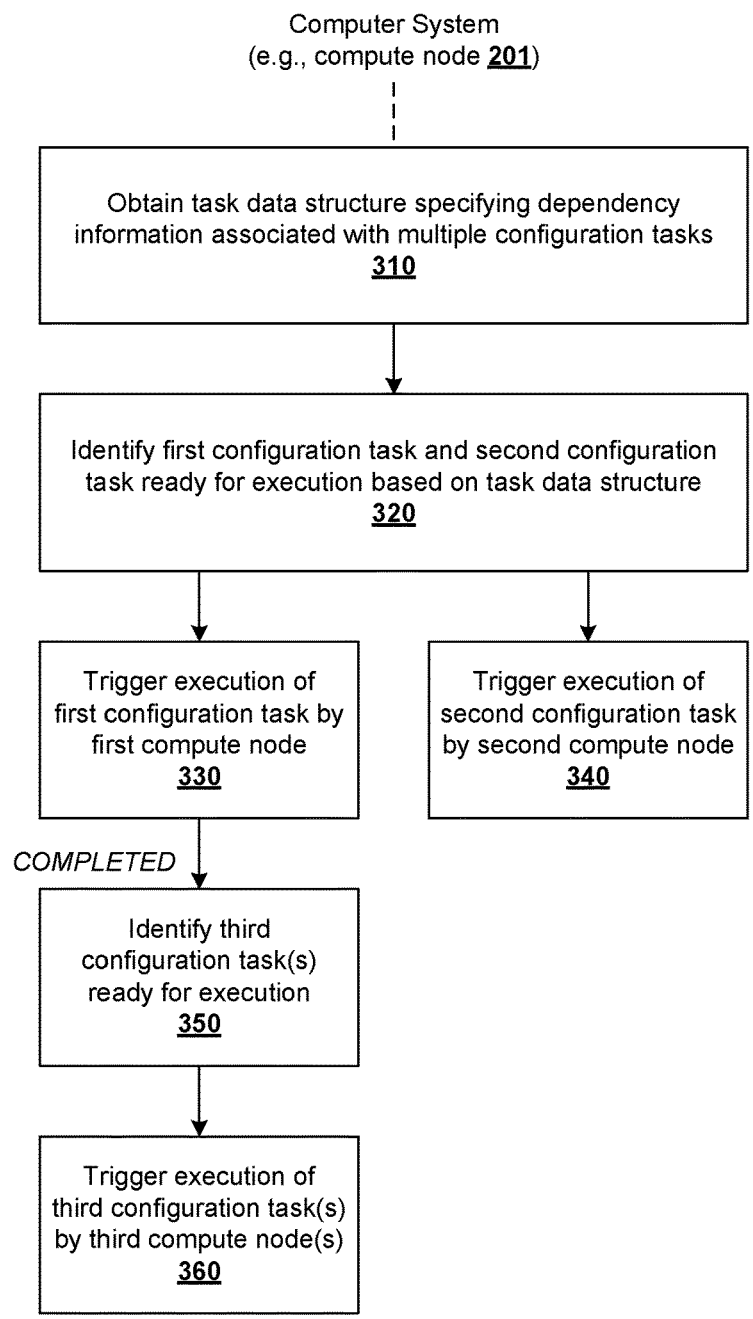
FIG. 3 is a flowchart of an example process for a computer system to perform cloud environment configuration based on task parallelization.

According to examples of the present disclosure, task parallelization may be implemented during cloud environment configuration to provide various benefits, such as improved efficiency, more scalable use of compute nodes (see 201-20N), more programmatic control compared to performing a single, long-running task, etc. FIG. 3 is a flowchart of example process 300 for a computer system to perform cloud environment configuration based on task parallelization. Example process 300 may include one or more operations, functions, or actions illustrated by one or more blocks, such as 310 to 360. The various blocks may be combined into fewer blocks, divided into additional blocks, and/or eliminated depending on the desired implementation. In practice, example process 300 may be performed by any suitable computer system 110 supporting a "compute node" (e.g., 201 in FIGS. 5A, 5B, 5C, 5D, and 5E) responsible for executing a "MAIN" task that triggers the execution of all tasks 210-270 in task data structure 280.

At 310 in FIG. 3, a task data structure (see 280 in FIG. 2) may be obtained. The task data structure may specify dependency information associated with a set of configuration tasks 210-270 that are executable to perform cloud environment configuration, such as to configure private cloud environment 101 and/or public cloud environment 102. The term "obtain" may refer generally to one entity retrieving, receiving or accessible information from a source, such as memory or data store storing task data structure 280 in FIG. 2.

At 320, 330 and 340 in FIG. 3, in response to identifying a first configuration task (e.g., "TASK C" 230) and a second configuration task (e.g., "TASK B" 220) that are ready for execution based on task data structure 280, execution of the first configuration task and the second configuration task may be triggered. In practice, the configuration tasks (e.g., "TASK C" 230 and "TASK B" 220) may be executed by a first compute node and a second compute node, respectively.

At 350 and 360 in FIG. 3, in response to determination that the first configuration task (e.g., "TASK C" 230) has been completed, execution of third configuration task(s) that are ready for execution may be triggered. Using the example in FIG. 2, "TASK F" 260 and "TASK G" 270 (i.e., third configuration tasks) are dependent from "TASK C" 230 based on task data structure 280, but independent from "TASK B" 220. As such, execution of "TASK F" 260 and "TASK G" 270 once "TASK C" 230 is completed, without waiting for "TASK B" 220 to complete.

According to examples of the present disclosure, task data structure 280 may be used to decouple the execution dependencies among tasks 210-270 from the underlying logic so that the dependencies are not hard-coded. At a particular time point, a configuration task that is "ready for execution" (i.e., independent from any incomplete task) may be identified dynamically from task data structure 280. This way, as configuration preferences and policies change, task data structure 280 may be updated to reflect the changes. In this case, compared to the conventional hard-coding approach, a modification of the underlying source code is not always necessary. Using task parallelization, cloud environment configuration may be performed in a more efficient and scalable manner. This should be contrasted against conventional approaches that necessitate a sequential order of execution, or a parent task has to wait for all of its child tasks to complete before new tasks are initiated.

As will be discussed using FIG. 4 to FIG. 8 below, task execution may be triggered at blocks 330, 340 and 360 using message broker 116. For example, block 330 may involve enqueueing, in message broker 116, a first message for retrieval by a first compute node. The message is to cause the first compute node to generate first context information associated with first configuration task. This way, child tasks="TASK F" 260 and "TASK G" 270 may inherit the context information associated with parent task="TASK C" 230. Similarly, child tasks="TASK D" 240 and "TASK G" 270 may inherit the context information associated with parent task="TASK C" 230.

Detailed Example

Figure 4:
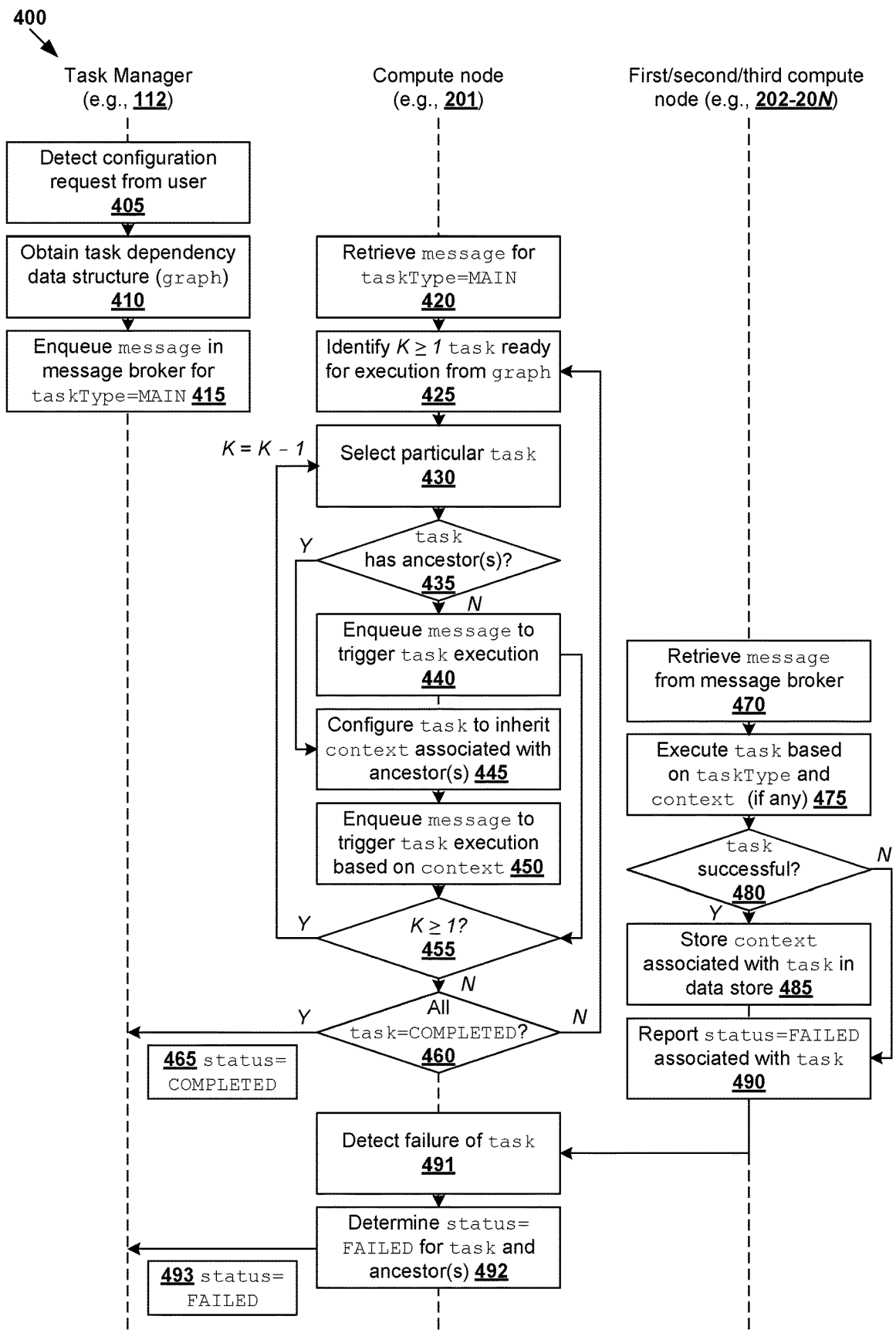
FIG. 4 is a flowchart of an example detailed process for cloud environment configuration based on task parallelization.

FIG. 4 is a flowchart of example detailed process 400 for cloud environment configuration based on task parallelization. Example process 400 may include one or more operations, functions, or actions illustrated at 405 to 493. The various operations, functions or actions may be combined into fewer blocks, divided into additional blocks, and/or eliminated depending on the desired implementation. The example in FIG. 4 will be explained using FIGS. 5A, 5B, 5C, 5D, and 5E, which are a series of schematic diagrams illustrating an example of cloud environment configuration based on task parallelization.

In the following, any suitable messaging solution may be used to implement message broker 116, such as RabbitMQ, Apache Kafka, SQS, NATS, IronMQ, etc. Any suitable data structure may be used to represent task data structure 280, such as a task dependency graph in FIG. 2, linked list, table, etc. As will be explained below, a "long-running" task may be divided into smaller tasks or phases. To manage task execution, a set of compute nodes 201-20N may be configured to consume messages from message broker 116. To trigger execution of a task, a message with the necessary information associated with the task may be added to message broker 115. One of the compute nodes may retrieve the message and execute the task to generate context information. The process will continue until the main task reaches a terminal state (i.e., FAILED or COMPLETED).

(a) Initiation

Figure 5A:
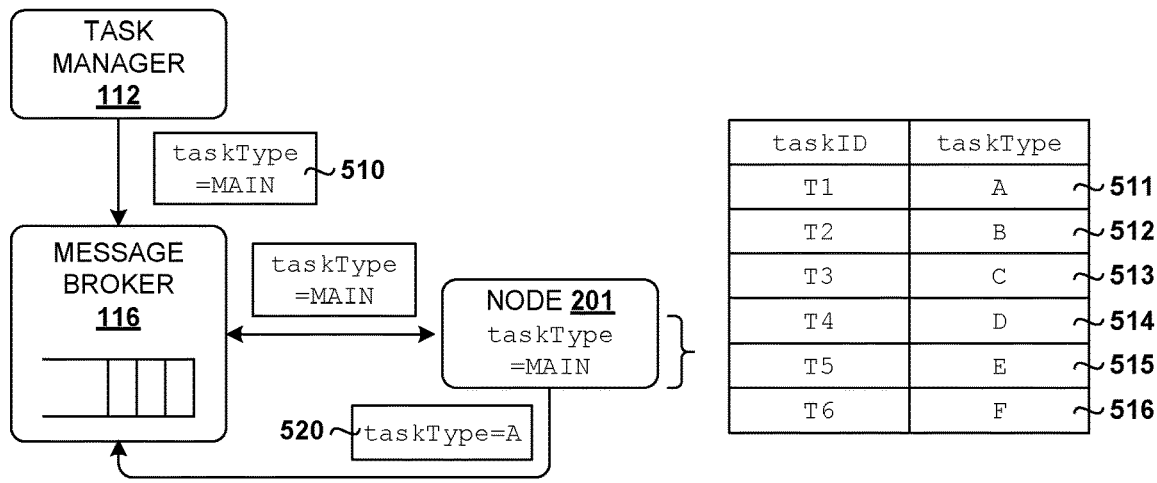
FIGS. 5A, 5B, 5C, 5D, and 5E are a series of schematic diagrams illustrating an example of cloud environment configuration based on task parallelization.

At 510 in FIG. 5A, task manager 112 may initiate or bootstrap a cloud environment configuration according to blocks 410-415 in FIG. 4. This may involve generating and enqueuing (or adding) a message (see 510) in message broker 116 to initiate a "MAIN" task. In practice, cloud environment configuration may be initiated based on a request received from a user (e.g., network administrator) via any suitable user interface, such as graphical user interface (GUI), command line interface (CLI), application programming interface (API). One example request may be in the form of a hypertext transfer protocol (HTTP) request.

Task manager 511 may configure message 510 based on a task dependency graph specifying a set of M tasks and associated dependency information. Each task may be defined using any suitable parameters, such as a task identifier (taskId), type (taskType), status (taskStatus), result to store result(s) of the task execution, etc. Each message may specify any suitable parameter(s) associated with a task, such as taskId, taskType and a list of tasks (currentRunningTaskIds). Based on task dependency graph 280 in FIG. 2, the "MAIN" task may represent a container task that specifies the set of M=7 tasks to be executed, which are tasks 210-270 (labelled "TASK A" to "TASK G"). See 511-517 in FIG. 5A.

(b) Main Task Execution

Referring to FIG. 5A again, compute node 201 may retrieve message 510 specifying (taskId=T0, taskType=MAIN) from message broker 116 and execute the "MAIN" task according to blocks 420-465, 491-493 in FIG. 4. Here, compute node 201 is responsible for executing the "MAIN" task, which controls the execution of tasks 210-270 based on task dependency graph.

In particular, compute node 201 may identify a subset of task(s) ready for execution based on task dependency graph 280, such as using any suitable graph traversal algorithm. At 520 in FIG. 5A, compute node 201 may identify that "TASK A" 210 is ready for execution, and trigger the execution by enqueuing a message specifying (taskId=T1, taskType=A) in message broker 116. "TASK A" 210 is a root task that does not have any ancestor. See blocks 420-440 in FIG. 4.

Figure 5B:
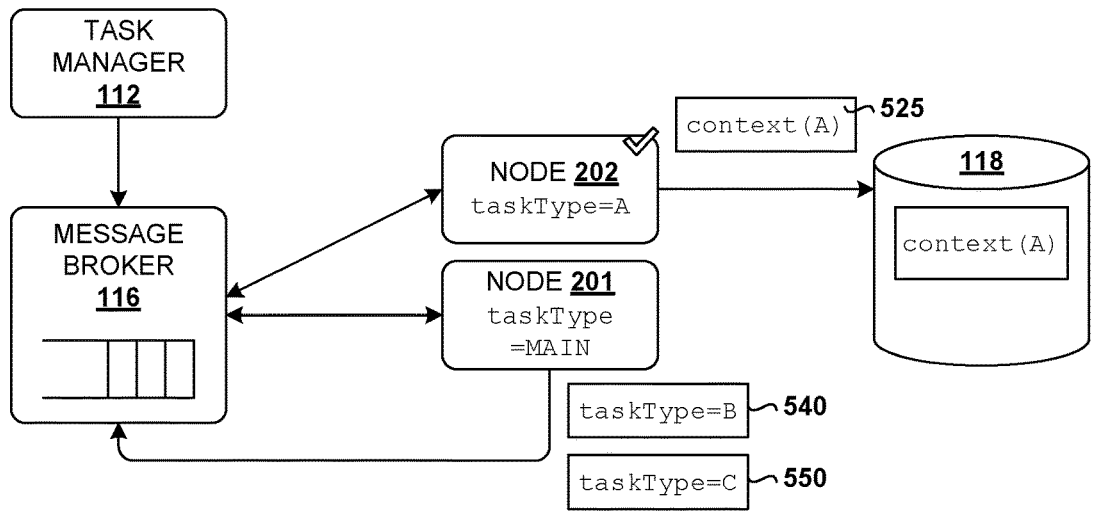

Referring to FIG. 5B, compute node 202 may retrieve message 520 specifying (taskId=T1, taskType=A) from message broker 116. Once "TASK A" 210 is executed, compute node 202 may store associated context information context(A) (see 525) in data store 118, which is accessible by compute nodes 201-20N. The "context information" may include any suitable information associated with a task, such as state information, result(s), pointer(s), parameter(s), etc. The context information may be stored in any suitable format, such as a set of key-value pair(s), etc. See blocks 470-485 in FIG. 4.

In response to detecting that "TASK A" 210 has been completed, compute node 201 may determine any new task(s) that are ready for execution. Based on task dependency graph 280, compute node 201 may determine that "TASK B" 220 and "TASK C" 230 may be executed in parallel. The parallel execution may be triggered by enqueuing two messages in message broker 116. A first message (see 530) specifies (taskId=T2, taskType=B), and a second message (see 540) specifies (taskId=T3, taskType=C).

One aspect of task parallelization is the sharing of task result between a parent task and its child task. According to examples of the present disclosure, a child task may inherit context information generated by each of its ancestors, which may be a parent task, grandparent task, and so on. For example, "TASK B" 220 and "TASK C" 230 will inherit context(A) from ancestor="TASK A" 210. In another example, "TASK F" 260 will inherit context(A,B) of ancestors="TASK A" 210 and "TASK C" 230, where context(A,B) represents a combination of context(A) and context(B). See blocks 425-435 and 445-450 in FIG. 4.

(c) Parallel Task Execution

Figure 5C:
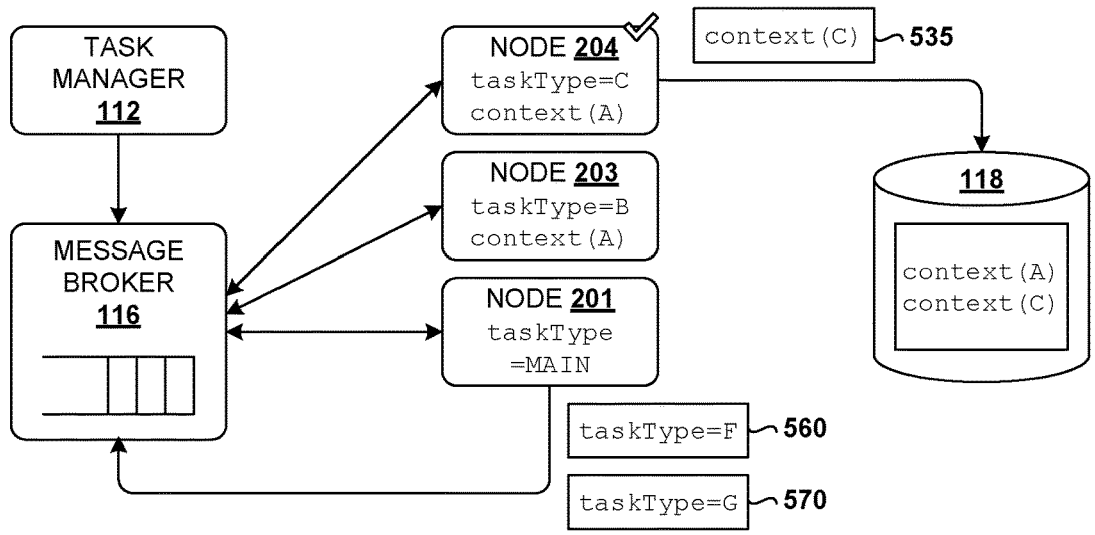

Referring to FIG. 5C, compute node 203 may retrieve message 530 specifying (taskId=T2, taskType=B) and execute "TASK B" 220 based on context (A) inherited from "TASK A" 210. Another compute node 204 may retrieve message 540 specifying (taskId=T3, taskType=C) and execute "TASK C" 230 based on context(A). Here, consider the scenario where "TASK C" 230 is completed before "TASK B" 220, and context(B) stored in data store 118. See blocks 470-485 in FIG. 4.

At compute node 201, in response to detecting that "TASK C" 230 has been completed, "TASK F" 260 and "TASK G" 270 may be identified to be ready for execution in parallel. In particular, "TASK F" 260 and "TASK G" are child tasks of parent task="TASK C" 230, but are independent from "TASK B" 220 that has not been completed. The parallel execution may be initiated by enqueuing two messages in message broker 116. A first message (see 560) specifies (taskId=T6, taskType=F), and a second message (see 570) specifies (taskId=T7, taskType=G).

Figure 5D:
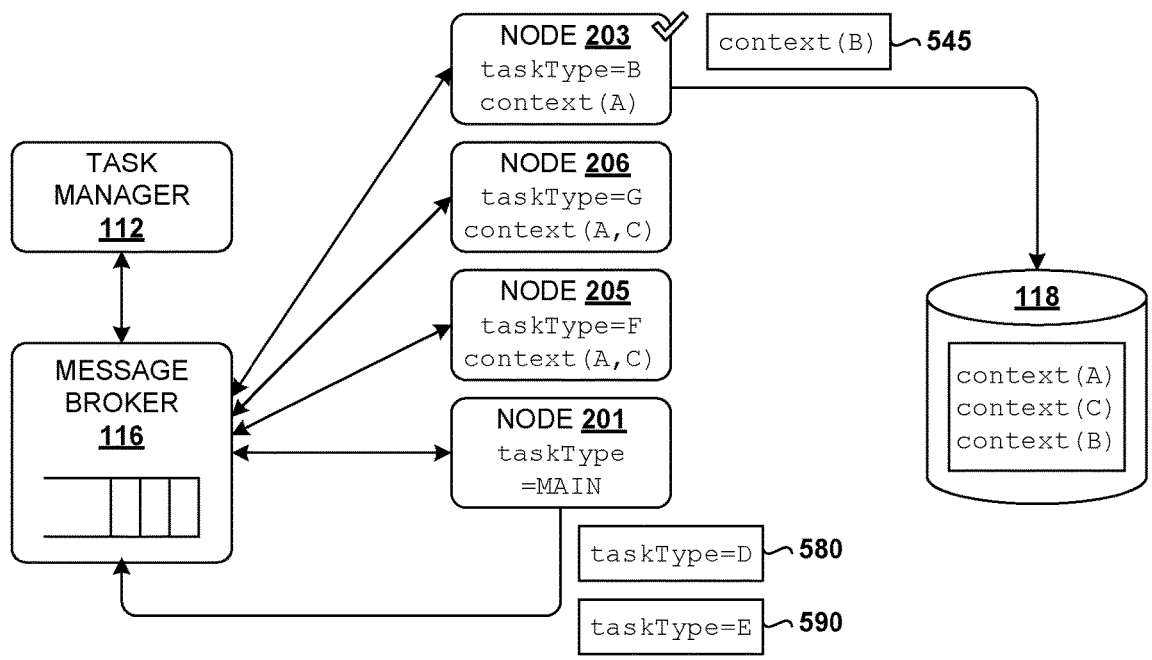
Figure 5E:
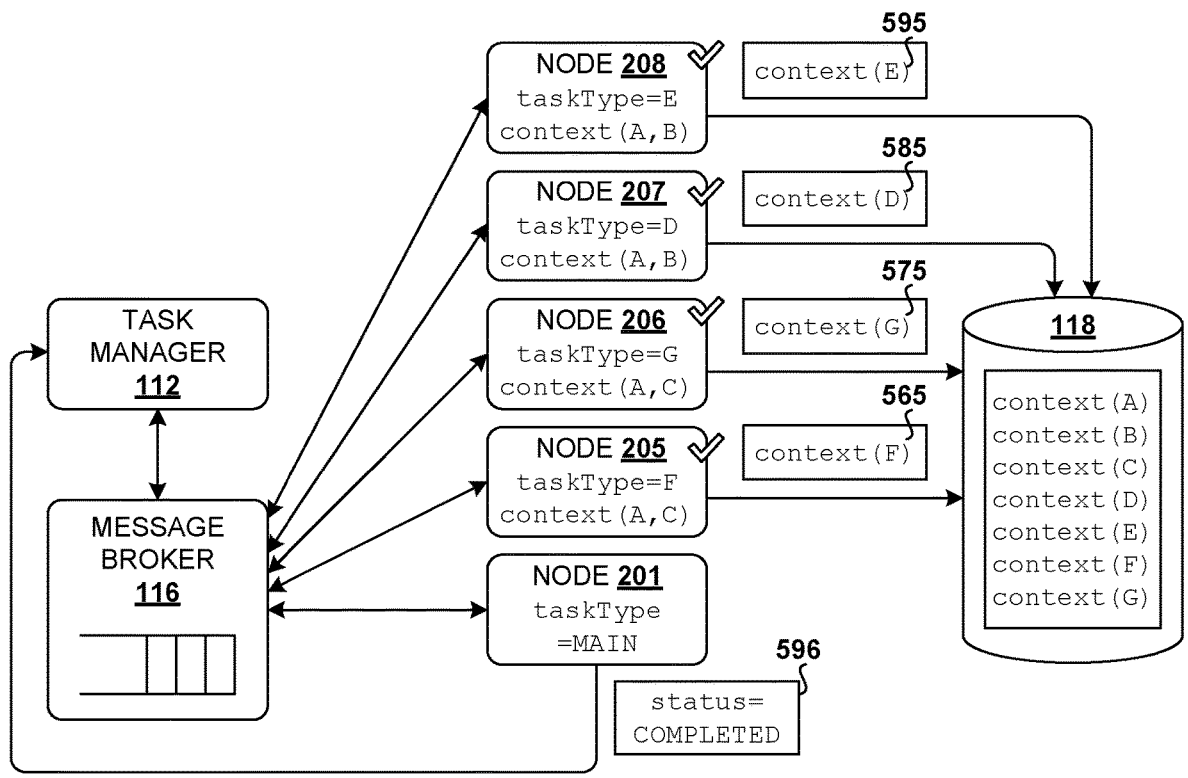

Referring to FIG. 5D, compute node 205 may retrieve message 560 specifying (taskId=T6, taskType=F) and execute "TASK F" 260 based on context(A, C), which represents a combination of context(A) and context(C). Another compute node 206 may retrieve message 570 specifying (taskId=T7, taskType=G) and execute "TASK G" 270 based on context(A, C). At this particular time point, three tasks are executed in parallel; see compute nodes 203, 205-206.

At compute node 201, in response to detecting that "TASK B" 220 has been completed (see context(B) at 545), "TASK D" 240 and "TASK E" 250 may be identified to be ready for execution in parallel. In particular, these tasks are child tasks of parent task="TASK B" 220, and independent from other tasks (i.e., "TASK F" 260 and "TASK G" 270) that have not been completed. The parallel execution may be triggered by enqueuing a first message (see 580) specifying (taskId=T4, taskType=D), and a second message (see 590) specifies (taskId=T5, taskType=E). See blocks 425-435 and 445-450 in FIG. 4.

Referring to FIG. 5D, compute node 207 may retrieve message 580 specifying (taskId=T4, taskType=D) and execute "TASK D" 240 based on context(A, B). Another compute node 208 may retrieve message 590 specifying (taskId=T5, taskType=E) and execute "TASK E" 250 based on context(A, B). At a particular time point, four tasks are executed in parallel by compute nodes 205-208. Once the tasks are completed (in any order), context(D), context(E), context(F) and context(G) may be stored in data store 118. See 565/575/585/595 in FIG. 5D and 470-485 in FIG. 4.

At compute node 201, since there is no remaining task for execution based on task dependency graph 280, a report (see 596 in FIG. 5D) specifying status=COMPLETED may be generated and sent to task manager 112. The user may be returned with (taskId=T0, taskType=MAIN) associated with the "MAIN" task. Depending on the desired implementation, report 596 may also provide a link to context information stored in data store 112. See blocks 460-465 in FIG. 4.

According to the examples in FIGS. 5A, 5B, 5C, 5D, and 5E, task parallelization may be used to improve the efficiency of cloud environment configuration. Instead of hard-coding the order of task execution in a sequential manner, task dependency graph 280 may be used to decouple the order of execution from the underlying logic of a compute node. Compute node 201 may identify task(s) that are ready for execution from task dependency graph 280, which may be updated as configuration processes or policies change in a more flexible manner. In the example in FIGS. 5A, 5B, 5C, 5D, and 5E, the "taskType" represents a particular task being executed by a particular compute node (e.g., taskType=MAIN for compute node 201). In practice, it should be understood that each compute node may be stateless and capable of executing any suitable task(s) based on message(s) from message broker 116. This also applies to the examples in FIGS. 6, 7A, and 7B.

Examples of the present disclosure should be contrasted against conventional approaches that rely on hard-coded logic that executes tasks in a sequential manner. One conventional approach may involve executing "TASK A" 210 first, then "TASK B" 220, followed remaining tasks 230-270 sequentially. Another conventional approach may execute "TASK B" 220 and "TASK C" 230 in parallel, but necessitates the completion of both tasks before initiating the remaining task according to hard-coded logic. In this case, even "TASK C" 230 was completed before "TASK B" 220 in FIG. 5C, "TASK F" 260 and "TASK G" 270 cannot be started until after "TASK B" 220 is completed. This lacks efficiency and scalability, especially then the complexity of cloud environment configuration increases. In these cases, if the set of tasks or their dependencies changes, the underlying source code has to be modified.

Failure Handling

According to examples of the present disclosure, when a child task has FAILED, its parent task will also be marked as FAILED. The process will continue until the root or "MAIN" task is marked as FAILED. An example will be described using FIG. 6, which is a schematic diagram illustrating example failure handling 600 during cloud environment configuration based on task parallelization. In this example, consider a scenario where a failure (see 610) that occurs during the execution of "TASK E" 250.

In relation to cloud environment configuration, failure 610 may be caused by various event(s), such as software and/or hardware failures, etc. For example, during cloud environment configuration, an error may be encountered when a resource limit is reached. Compute node 201 executing the "MAIN" task may detect failure 610 based on any suitable indicator (e.g., error message) from compute node 208 at which failure 610 occurs. In response detecting that child="TASK E" 250 has FAILED, compute node 201 may identify parent="TASK B" 220 and grandparent="TASK A" 210 based on task dependency graph 208, and mark them as FAILED.

Figure 6:
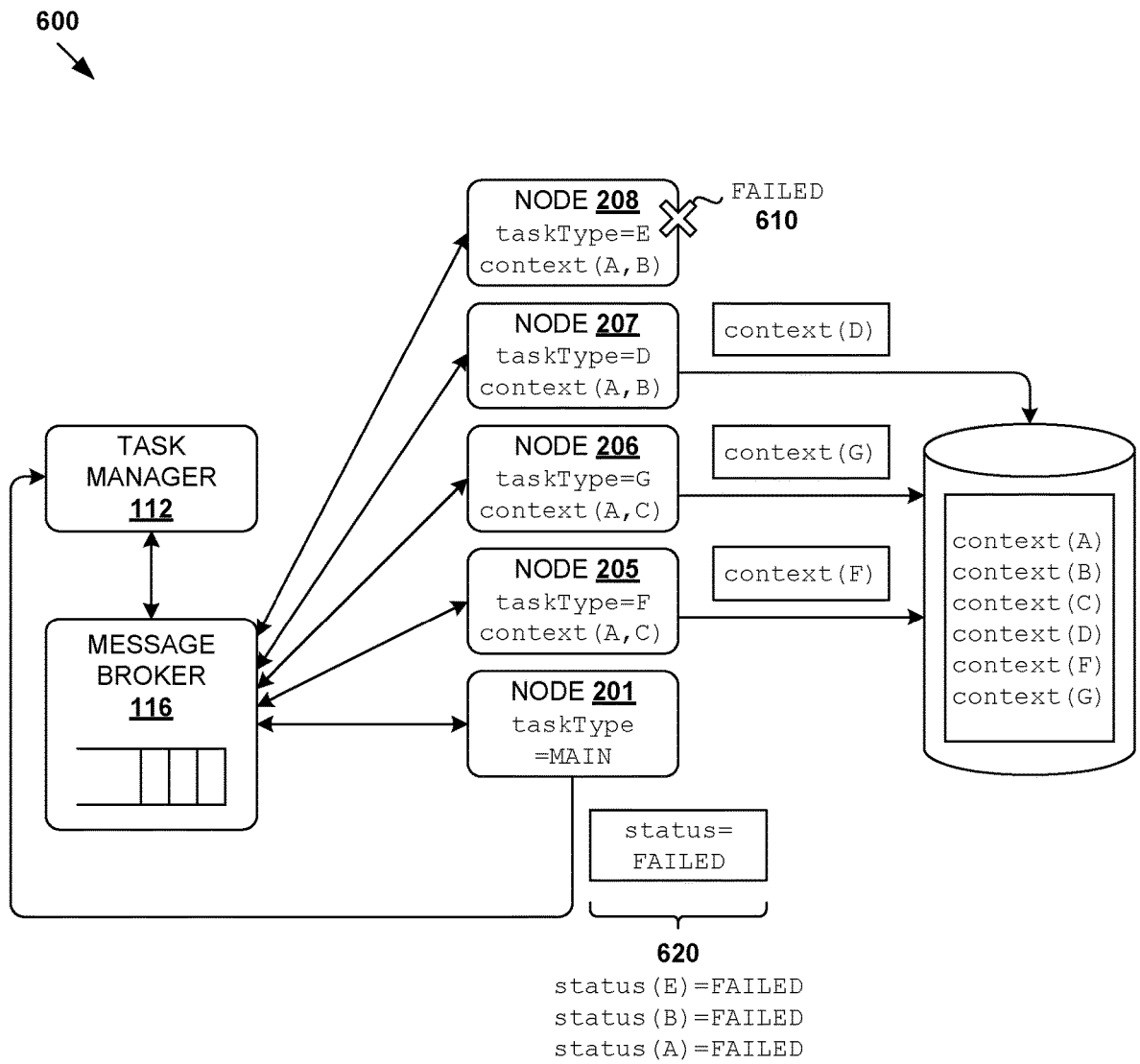
FIG. 6 is a schematic diagram illustrating an example failure handling during cloud environment configuration.

At 620 in FIG. 6, compute node 201 may generate and send a report message to task manager 112 to report the failure of "TASK E" 250, "TASK B" 220 and "TASK A" 210. As such, "TASK A" 210 will be marked as FAILED even though some other child tasks have been completed successfully. A parent task only transitions to FINISHED when all its child tasks are successfully completed. See 490-493 in FIG. 4.

Depending on the desired implementation, task manager 112 may calculate a progress percentage during cloud environment configuration. For conventional serial execution, the percentage may be increased after the completion of each task. Using task parallelization, however, the percentage calculation is generally more complicated. One example may involve increasing the progress percentage of a parent task when its child tasks are started based on task dependency graph 280.

Public Cloud Environment

Figure 7A:
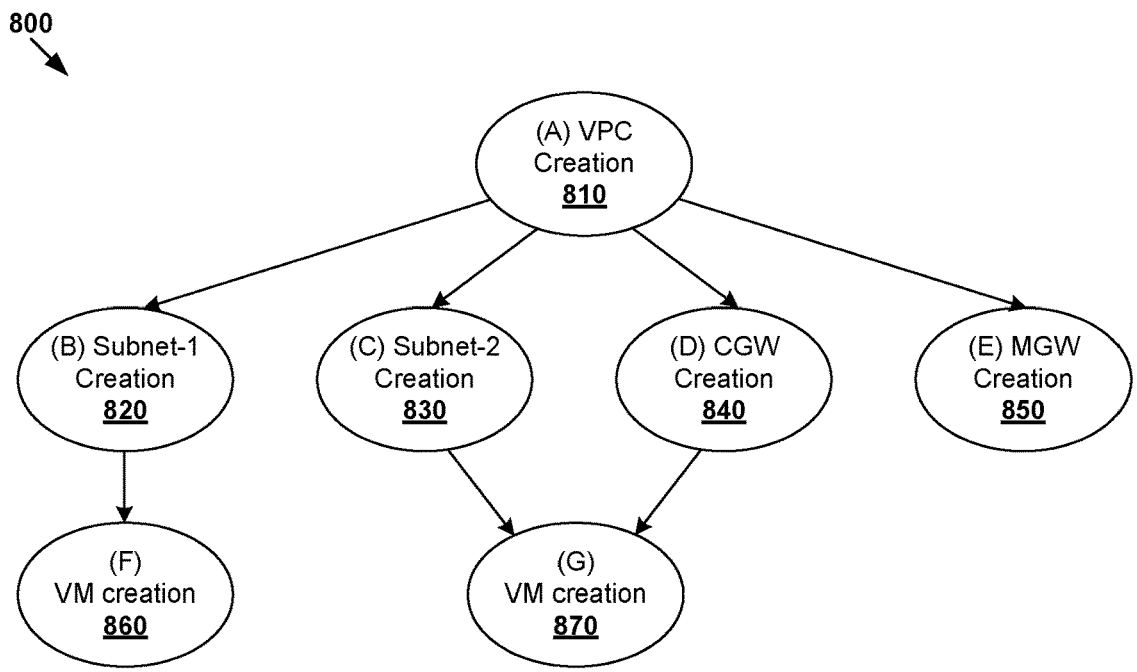
FIGS. 7A and 7B are a series of schematic diagrams illustrating an example of public cloud environment configuration based on task parallelization.
Figure 7B:
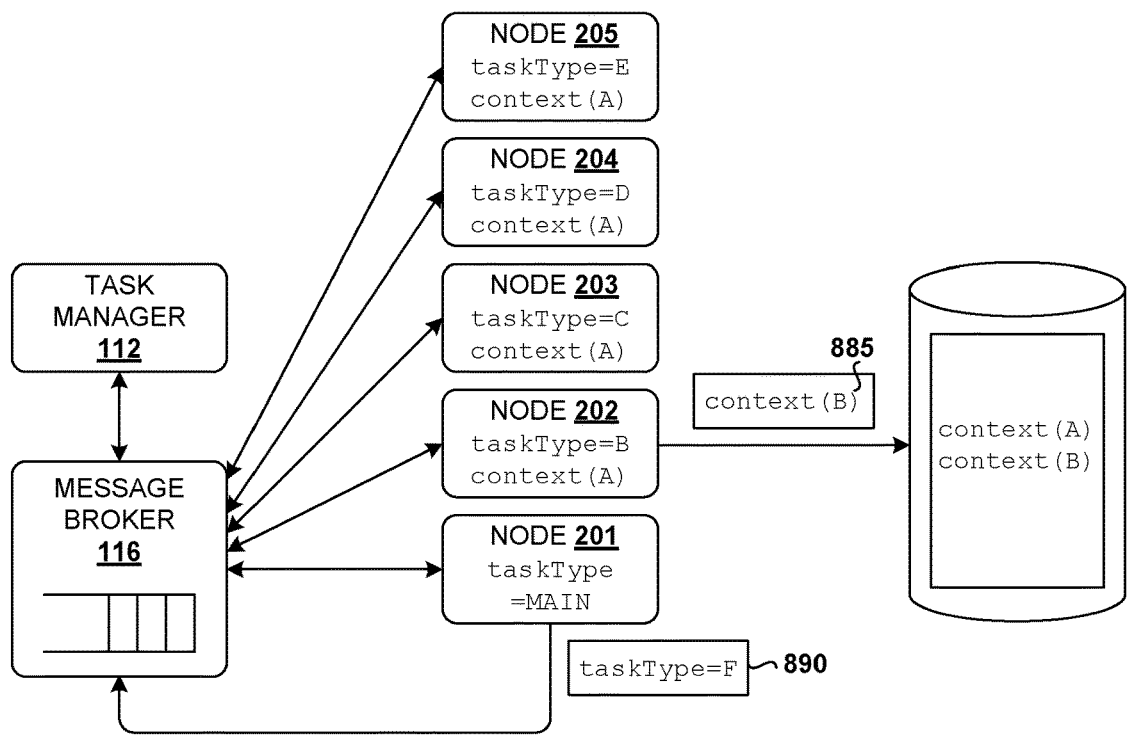

FIGS. 7A and 7B are a series of schematic diagrams illustrating an example of public cloud environment configuration based on task parallelization. In the example in FIG. 7A, task data structure 800 specifies dependency information associated with a set of configuration tasks 810-870, which are executable by compute nodes 201-20N to configure public cloud environment 102 in FIG. 1. In the context of Amazon AWS, example configuration tasks may include VPC creation (see 810), subnet-1=10.0.0.0/24 creation (see 820), subnet-2=20.0.0.0/24 creation (see 830), CGW creation (see 840), MGW creation (see 850), and VM creation (see 860-870).

FIG. 7B shows the state of task execution at a particular time point at which compute node 201 is executing a "MAIN" task, while remaining compute nodes 202-205 are executing tasks 820-850 respectively. Based on task data structure 800, compute node 201 may trigger execution of tasks 810-870 according to blocks 420-465 and 491-493 in the example in FIG. 4. For a particular task, one of the remaining compute nodes 202-20N may perform the execution according to blocks 470-490 in FIG. 4.

In response to detecting that task 820 (i.e., subnet-1 creation) has been completed by compute node 202, compute node 201 may identify that task 860 (i.e., VM creation) is ready for execution. As such, compute node 201 may trigger the execution of task 860 by enqueueing a message (see 890) in message broker 116. Message 890 is to cause a compute node to execute task 860 based on context information associated with task 820. Various implementation details discussed using FIGS. 5A, 5B, 5C, 5D, and 5E are also applicable here, and will not be repeated for brevity.

Physical Implementation

Figure 8:
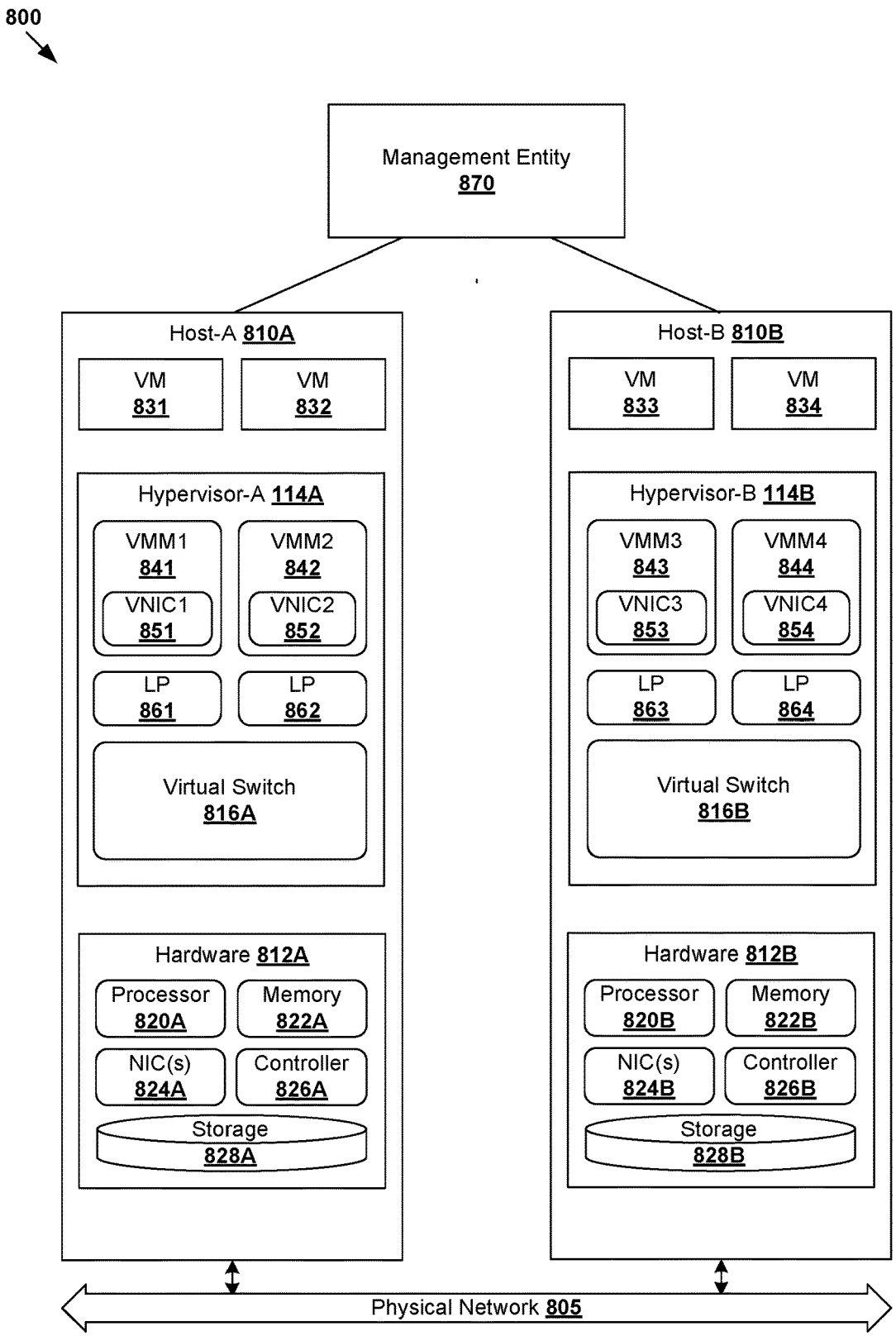
FIG. 8 is a schematic diagram illustrating an example physical implementation view of a cloud environment.

FIG. 8 is a schematic diagram illustrating physical implementation view 800 of example cloud environment 101/102 in FIG. 1. Depending on the desired implementation, physical implementation view 800 may include additional and/or alternative component(s) than that shown in FIG. 8. In the example in FIG. 8, VMs 831-834 (e.g., VMs 131-134 or 155-158 in FIG. 1) may be supported by hosts 810A-B (e.g., 120A-B in FIG. 1). Hosts 810A-B are also known as "end hosts," "computing devices", "host computers", "host devices", "physical servers", "server systems", "physical machines" etc.).

Hosts 810A-B may each include virtualization software (e.g., hypervisor 814A/814B) that maintains a mapping between underlying hardware 812A/812B and virtual resources allocated to VMs 831-834. Hosts 810A-B may be interconnected via a physical network formed by various intermediate network devices, such as physical network devices (e.g., physical switches, physical routers, etc.) and/or logical network devices (e.g., logical switches, logical routers, etc.). Hardware 812A/812B includes suitable physical components, such as processor(s) 820A/820B; memory 822A/822B; physical network interface controller(s) or NIC(s) 824A/824B; and storage disk(s) 828A/828B accessible via storage controller(s) 826A/826B, etc.

Virtual resources are allocated to each VM to support a guest operating system (OS) and applications. Corresponding to hardware 812A/812B, the virtual resources may include virtual CPU, virtual memory, virtual disk, virtual network interface controller (VNIC), etc. Hardware resources may be emulated using virtual machine monitors (VMMs) 841-844, which may be considered as part of (or alternatively separated from) corresponding VMs 831-834. For example, VNICs 851-854 are virtual network adapters emulated by respective VMMs 841-844.

Although examples of the present disclosure refer to VMs, it should be understood that a "virtual machine" running on a host is merely one example of a "virtualized computing instance." or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc.

Hypervisor 814A/814B further implements virtual switch 815A/815B to handle egress packets from, and ingress packets to, corresponding VMs 831-834. The term "packet" may refer generally to a group of bits that can be transported together from a source to a destination, such as message, segment, datagram, etc. The term "traffic" may refer generally to a flow of packets. The term "layer 2" may refer generally to a Media Access Control (MAC) layer; "layer 3" to a network or Internet Protocol (IP) layer; and "layer-4" to a transport layer (e.g., using transmission control protocol (TCP) or user datagram protocol (UDP)) in the Open System Interconnection (OSI) model, although the concepts described herein may be used with other networking models.

Any suitable management entity or entities 870 may be deployed. In public cloud environment 102, example network management entities may include a network manager, a cloud service manager and a network controller. In private cloud environment 101, example network management entities may include a network controller (e.g., NSX controller component of VMware NSX®) and a network manager (e.g., NSX manager component). Each management entity 870 may be implemented using physical machine(s), virtual machine(s), a combination thereof, etc.

Although explained using VMs, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 8, cloud environment configuration may involve configuring various containers inside respective VMs using any suitable container technologies. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine") not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 8. For example, the instructions or program code, when executed by the processor of the computer system, may cause the processor to implement a "computer system" to perform cloud environment configuration based on task parallelization.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

I claim:

1. A method for a computer system to perform cloud environment configuration based on task parallelization, wherein the method comprises:

obtaining a task data structure specifying execution dependency information associated with a set of multiple configuration tasks that are executable to perform cloud environment configuration;

in response to identifying, from the set, a first configuration task and a second configuration task that are ready for execution based on the task data structure, triggering execution of the first configuration task and the second configuration task by a first compute node and a second compute node, respectively; and in response to determination that the first configuration task has been completed, identifying, from the set, one or more third configuration tasks that are ready for execution based on the task data structure, wherein the one or more third configuration tasks are dependent from the first configuration task and independent from the second configuration task; and triggering execution of the one or more third configuration tasks by respective one or more third compute nodes, thereby parallelizing execution of the second configuration task and the one or more third configuration tasks.

2. The method of claim 1, wherein triggering execution of the first configuration task and the second configuration task comprises:
enqueueing, in a message broker, a first message for retrieval by the first compute node, wherein the first message is configured to cause the first compute node to generate first context information associated with the first configuration task, wherein the one or more third compute nodes inherit the first context information.

3. The method of claim 2, wherein triggering execution of the one or more third configuration tasks comprises:
enqueueing, in the message broker, one or more third messages for retrieval by the respective one or more third compute nodes, wherein a particular third message is configured to cause a particular third compute node to execute the particular third configuration task based on the first context information.

4. The method of claim 2, wherein the method further comprises:
retrieving, from the message broker, a main configuration task that identifies the set of multiple configuration tasks; and
executing the main configuration task to trigger execution of the set of multiple configuration tasks.

5. The method of claim 1, wherein the method further comprises:
in response to detecting that a particular third configuration task has failed, determining that the first configuration task has also failed, wherein the particular third configuration task being dependent from the first configuration task.

6. The method of claim 1, wherein the method further comprises:
in response to determination that the set of multiple configuration tasks have been successfully completed, generating and sending a report to a task manager.

7. The method of claim 1, wherein obtaining a task data structure comprises:
obtaining a task dependency graph, being the task data structure specifying dependency information associated with one or more of the following configuration tasks: creating a logical element in a cloud environment, updating the logical element, removing the logical element, and setting a characteristic or behaviour associated with the logical element.

8. A non-transitory computer-readable storage medium that includes a set of instructions which, in response to execution by a processor of a computer system, cause the processor to perform a method of cloud environment configuration based on task parallelization, wherein the method comprises:
obtaining a task data structure specifying execution dependency information associated with a set of multiple configuration tasks that are executable to perform cloud environment configuration;
in response to identifying, from the set, a first configuration task and a second configuration task that are ready for execution based on the task data structure, triggering execution of the first configuration task and the second configuration task by a first compute node and a second compute node, respectively; and
in response to determination that the first configuration task has been completed,
identifying, from the set, one or more third configuration tasks that are ready for execution based on the task data structure, wherein the one or more third configuration tasks are dependent from the first configuration task and independent from the second configuration task; and
triggering execution of the one or more third configuration tasks by respective one or more third compute nodes, thereby parallelizing execution of the second configuration task and the one or more third configuration tasks.

9. The non-transitory computer-readable storage medium of claim 8, wherein triggering execution of the first configuration task and the second configuration task comprises:
enqueueing, in a message broker, a first message for retrieval by the first compute node, wherein the first message is configured to cause the first compute node to generate first context information associated with the first configuration task, wherein the one or more third compute nodes inherit the first context information.

10. The non-transitory computer-readable storage medium of claim 9, wherein triggering execution of the one or more third configuration tasks comprises:
enqueueing, in the message broker, one or more third messages for retrieval by the respective one or more third compute nodes, wherein a particular third message is configured to cause a particular third compute node to execute the particular third configuration task based on the first context information.

11. The non-transitory computer-readable storage medium of claim 9, wherein the method further comprises:
retrieving, from the message broker, a main configuration task that identifies the set of multiple configuration tasks; and
executing the main configuration task to trigger execution of the set of multiple configuration tasks.

12. The non-transitory computer-readable storage medium of claim 8, wherein the method further comprises:
in response to detecting that a particular third configuration task has failed, determining that the first configuration task has also failed, wherein the particular third configuration task being dependent from the first configuration task.

13. The non-transitory computer-readable storage medium of claim 8, wherein the method further comprises:
in response to determination that the set of multiple configuration tasks have been successfully completed, generating and sending a report to a task manager.

14. The non-transitory computer-readable storage medium of claim 8, wherein obtaining a task data structure comprises:
obtaining a task dependency graph, being the task data structure specifying dependency information associated with one or more of the following configuration tasks: creating a logical element in a cloud environment, updating the logical element, removing the logical element, and setting a characteristic or behaviour associated with the logical element.

15. A computer system configured to perform cloud environment configuration based on task parallelization, wherein the computer system comprises:
a processor; and
a non-transitory computer-readable medium having stored thereon instructions that, when executed by the processor, cause the processor to:
obtain a task data structure specifying execution dependency information associated with a set of multiple configuration tasks that are executable to perform cloud environment configuration;

in response to identifying, from the set, a first configuration task and a second configuration task that are ready for execution based on the task data structure, trigger execution of the first configuration task and the second configuration task by a first compute node and a second compute node, respectively; and in response to determination that the first configuration task has been completed, identify, from the set, one or more third configuration tasks that are ready for execution based on the task data structure, wherein the one or more third configuration tasks are dependent from the first configuration task and independent from the second configuration task; and trigger execution of the one or more third configuration tasks by respective one or more third compute nodes, thereby parallelizing execution of the second configuration task and the one or more third configuration tasks.

16. The computer system of claim 15, wherein the instructions for triggering execution of the first configuration task and the second configuration task cause the processor to:

enqueue, in a message broker, a first message for retrieval by the first compute node, wherein the first message is configured to cause the first compute node to generate first context information associated with the first configuration task, wherein the one or more third compute nodes inherit the first context information.

17. The computer system of claim 16, wherein the instructions for triggering execution of the one or more third configuration tasks cause the processor to:

enqueue, in the message broker, one or more third messages for retrieval by the respective one or more third compute nodes, wherein a particular third message is configured to cause a particular third compute node to execute the particular third configuration task based on the first context information.

18. The computer system of claim 16, wherein the instructions further cause the processor to:

retrieve, from the message broker, a main configuration task that identifies the set of multiple configuration tasks; and execute the main configuration task to trigger execution of the set of multiple configuration tasks.

19. The computer system of claim 15, wherein the instructions further cause the processor to:

in response to detecting that a particular third configuration task has failed, determine that the first configuration task has also failed, wherein the particular third configuration task being dependent from the first configuration task.

20. The computer system of claim 15, wherein the instructions further cause the processor to:

in response to determination that the set of multiple configuration tasks have been successfully completed, generate and send a report to a task manager.

21. The computer system of claim 15, wherein the instructions for obtaining a task data structure cause the processor to:

obtain a task dependency graph, being the task data structure specifying dependency information associated with one or more of the following configuration tasks: creating a logical element in a cloud environment, updating the logical element, removing the logical element, and setting a characteristic or behaviour associated with the logical element.

* * * * *